United States Patent
Takamizawa et al.

(10) Patent No.: US 9,673,687 B2
(45) Date of Patent: Jun. 6, 2017

(54) FIXTURE FOR SECURING TEMPERATURE DETECTION ELEMENT, MOTOR, AND METHOD OF SECURING TEMPERATURE DETECTION ELEMENT

(71) Applicant: FANUC CORPORATION, Yamanashi (JP)

(72) Inventors: Suguru Takamizawa, Yamanashi (JP); Yoshifumi Shimura, Yamanashi (JP); Masatoyo Sogabe, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/057,545

(22) Filed: Mar. 1, 2016

(65) Prior Publication Data

US 2016/0261175 A1    Sep. 8, 2016

(30) Foreign Application Priority Data

Mar. 3, 2015   (JP) ................... 2015-041817

(51) Int. Cl.
*H02K 11/00* (2016.01)
*H02K 11/25* (2016.01)
*H02K 3/32* (2006.01)

(52) U.S. Cl.
CPC ............ *H02K 11/25* (2016.01); *H02K 3/325* (2013.01)

(58) Field of Classification Search
CPC .... H02K 11/00; H02K 11/0047; H02K 11/25; H02K 5/08; H02K 3/34; H02K 3/50; H02K 15/02; G01K 11/00; G01K 11/32; G01K 13/08

USPC ............................................ 310/67 R, 68 C
See application file for complete search history.

(56) References Cited

U.S. PATENT DOCUMENTS

| 4,890,025 A | * | 12/1989 | Hadeler | ............... | H02K 11/25 310/43 |
| 6,153,954 A | * | 11/2000 | Uchida | ............... | H02K 11/25 310/68 C |
| 7,633,197 B2 | * | 12/2009 | Isoda | ............... | H02K 11/25 310/68 C |

(Continued)

FOREIGN PATENT DOCUMENTS

| JP | 61205266 U | 12/1986 |
| JP | 200392858 A | 3/2003 |

(Continued)

OTHER PUBLICATIONS

English Abstract and Machine Translation for Japanese Publication No. 2003-092858 A, published Mar. 28, 2003, 10 pgs.

(Continued)

*Primary Examiner* — Tran Nguyen
(74) *Attorney, Agent, or Firm* — Fredrikson & Byron, P.A.

(57) ABSTRACT

A fixture which secures a temperature detection element to a winding provided around a stator core of a motor, includes a main body to be inserted into a gap between the stator core and the winding, and an engagement portion formed on one end side of the main body on one side of the main body to engage with the rim of the opening of the winding. On the one side of the main body a recess is formed to house a temperature sensitive part of the temperature detection element. The depth of the recess is less than the maximum thickness of the temperature sensitive part of the temperature detection element.

7 Claims, 10 Drawing Sheets

(56) References Cited

U.S. PATENT DOCUMENTS

2012/0043863 A1* 2/2012 Takahashi ............. G01K 11/32
310/68 C

FOREIGN PATENT DOCUMENTS

| JP | 2007-049783 | * | 2/2007 | ............. H02K 11/00 |
| JP | 2013158078 A | | 8/2013 | |
| WO | 0051222 A1 | | 8/2000 | |

OTHER PUBLICATIONS

English Abstract and Machine Translation for Japanese Publication No. 2013-158078 A, published Aug. 15, 2013, 28 pgs.
English Abstract for Japanese Publication No. 61-205266 U1, published Dec. 24, 1986, 2 pgs.
Untranslated Notification of Reasons for Refusal mailed by JPO, Jun. 14, 2016, 3 pages.
English machine translation of Notification of Reasons for Refusal mailed by JPO, Jun. 14, 2016, 3 pages.
Untranslated Decision to Grant a Patent mailed by JPO, Jul. 12, 2016, 3 pages.
English machine translation of Decision to Grant a Patent mailed by JPO, Jul. 12, 2016, 3 pages.

\* cited by examiner

FIXTURE FOR SECURING TEMPERATURE DETECTION ELEMENT, MOTOR, AND METHOD OF SECURING TEMPERATURE DETECTION ELEMENT

BACKGROUND OF THE INVENTION

1. Field of the Invention

The present invention relates to a fixture for securing a temperature detection element and a method of securing the temperature detection element therewith. In particular, the present invention relates to a fixture securing a temperature detection element to windings (magnetic wire portion) wound around a stator core in a motor, a motor to which the fixture is provided, and a method for securing a temperature detection element in a motor.

2. Description of the Related Art

Figure 9:
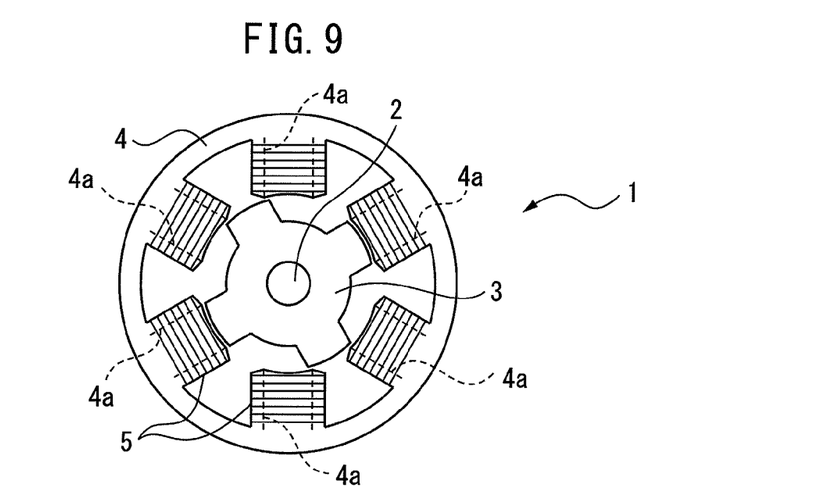
FIG. 9 is a view schematically illustrating the internal configuration of a common motor.

FIG. 9 schematically illustrates the internal configuration of a common motor. A common motor 1 comprises a rotor 3 which rotates around a central shaft 2, and a stator 4 which applies a magnetic rotational force to the rotor. On the inner peripheral surface of the stator 4, a plurality of protrusions 4a are formed equidistantly in the circumferential direction of the rotor 3. Copper wires (conductive wires) 5 are wound around the protrusions 4A, the copper wires being coated by an insulating layer (not shown). Further, FIG. 9 illustrates the motor 1 which generates rotational motion, however, a motor which generates linear motion, namely a linear motor is also well known. A stator of a linear motor uses a magnetic plate which extends in a straight line, on which a plurality of protrusions are formed equidistantly along the extending direction, and copper wires are wound around the protrusions.

Hereinafter, the portions formed from wires wound around the circumference of the protrusions will be referred to as windings. Further, the term stator core may be used to refer to the protrusions.

The windings of an electric motor, as described above, generate heat due to copper loss or iron loss, etc. When a high load is required of an electric motor, it is necessary to apply a large current through the windings, thus the windings rapidly generate heat. If the temperature of the windings exceeds a predetermined temperature, the insulating layer of the copper wire may melt or burn out. In such cases there is a risk of the copper exposed from the insulating layer contacting a nearby conductor and causing an electrical short. Accordingly, there is a need to secure a temperature detection element to the windings to thereby swiftly and accurately detect when the temperature exceeds the predetermined temperature of the windings in order to prevent such problems from occurring. As methods for securing a temperature detection element to a winding, the following conventional examples have been used.

Figure 10A:
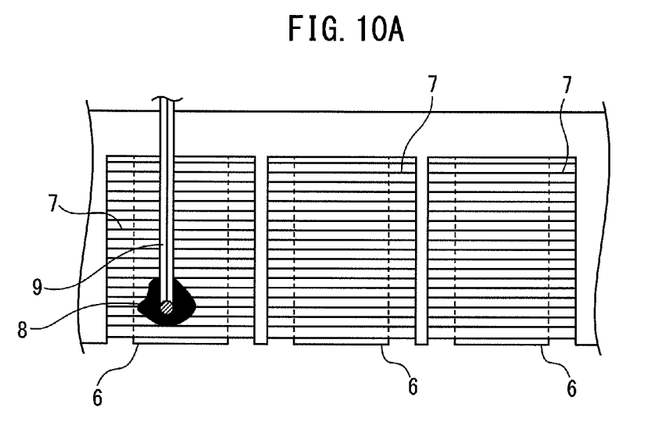
FIG. 10A is a lateral view illustrating the first conventional method of securing the temperature detection element to windings.
Figure 10B:
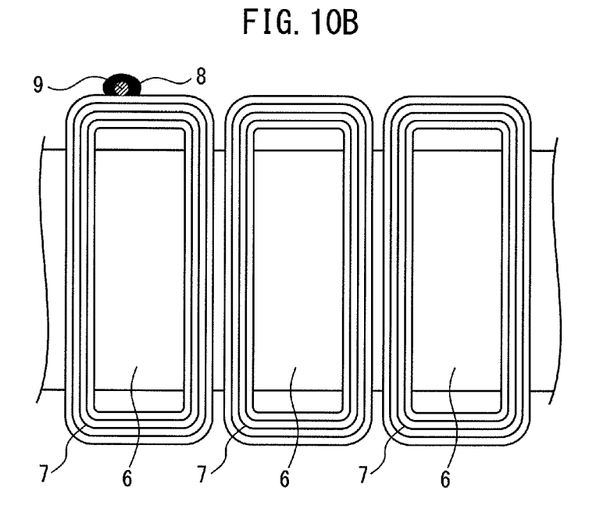
FIG. 10B is a bottom view illustrating the first conventional method of securing the temperature detection element to windings.

FIGS. 10A and 10B illustrate the first conventional example of a method for securing a temperature detection element to a winding. FIG. 10A is a lateral view showing part of a stator of a linear motor, and FIG. 10B is a plan view of the stator shown in FIG. 10A.

According to the first conventional example, as shown in FIGS. 10A and 10B, a temperature sensitive part of a temperature detection element 9 is secured to the outer surface of a winding 7 provided around any stator core 6 by an adhesive 8.

Figure 11:
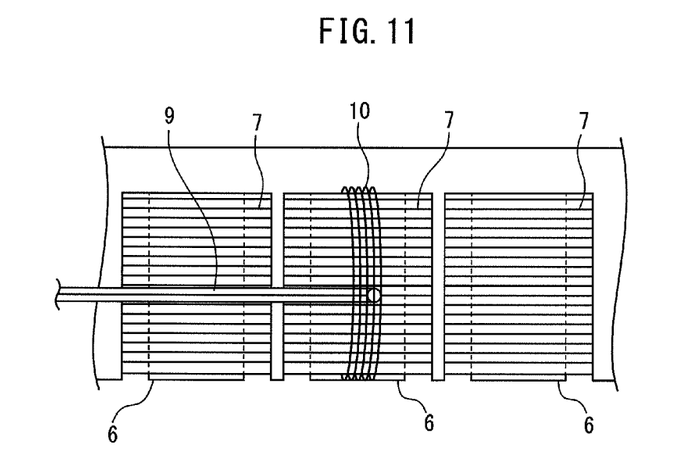
FIG. 11 is a lateral view illustrating the second conventional method of securing the temperature detection element to windings.

FIG. 11 is a lateral view of the stator of the second conventional example.

According to the second conventional example, as shown in FIG. 11, a temperature sensitive part of a temperature detection element 9 is disposed on the outer surface of a winding 7. A string 10 is passed through a gap between the winding 7 and a stator core 6 and wound onto one side of the winding 7, thereby securing the temperature sensitive part of the temperature detection element 9 between the string 10 and the winding 7.

Furthermore, Japanese Patent Laid-Open No. 2003-92858 discloses another method for securing a temperature detection element onto windings.

In the method described in Japanese Patent Laid-Open No. 2003-92858, a guide provided with a cut-out portion formed to be open at one end thereof is inserted into a gap between a stator core and the coil end of the windings. The other end of the guide is the front end in the insertion direction and is provided with elastically deformable hooks. The guide is inserted into the gap by deforming the hooks, and when the other end of the guide is released from the gap, the hooks engage with the rim of the opening of the winding to thereby secure the guide thereto. Next, the temperature sensitive part of the temperature detection element is inserted into the cut-out portion through the opening of the one end of the guide and the temperature sensitive part is made to contact the inside surface of the windings. Further, the bottom of the cut-out portion in which the temperature sensitive part is to be housed is configured to be resilient, so that the temperature sensitive part of the temperature detection element can be strongly pressed against the inside surface of the winding.

However, in the first conventional example, the temperature detection element 9 may be accidentally displaced before the adhesive with which the temperature sensitive part of the temperature detection element 9 is adhered to the outer surface of the winding 7 completely hardens. Thus the temperature sensitive part of the temperature detection element may be secured to a position of the winding 7 different from a desired position for measuring the temperature, and the problem of not being able to obtain the expected accuracy of temperature detection may occur.

In the second conventional example, securing the temperature sensitive part of the temperature detection element 9 by the string wound onto the one side of the winding 7 is not simple, requiring a large number of man-hours. Further, a certain amount of skill is required in order to accurately secure the temperature sensitive part of the temperature detection element 9 to the desired position for measuring the temperature of the winding 7.

Further, in securing methods utilizing an adhesive as in the first conventional example, it is difficult to correct the position of the temperature detection element after the adhesive has completely hardened. Whereas, in securing methods utilizing a string as in the second conventional example; it is possible to correct the position of the temperature detection element. However, much time and effort is required for the correction as the work requires unraveling the string, adjusting the position of the temperature detection element and retying the string.

Further, in the other conventional example, as described in Japanese Patent Laid-Open No. 2003-92858, as the temperature sensitive part of the temperature detection element contacts the inside surface of the winding, it is necessary to design the shape of the outer surfaces of the guide and the temperature sensitive part to fit the shape, for example the curvature, of the inner surface of the winding. Namely, a method for closely attaching each of the outer surfaces of the guide and the temperature sensitive part to the inner surface of the winding is employed. Thus it is not easy to remove the guide from the gap between the stator core and the coil end of the windings after the guide and the temperature detection element have been inserted into the gap between the stator core and the coil end.

Moreover, Japanese Patent Laid-Open No. 2003-92858 describes that the hooks are provided on the other end of the guide which is the front end in the insertion direction, and engage the rim of the opening of the winding when released from the gap. Thus it is necessary to deform the hooks when removing the guide from the gap.

Therefore, in the method described in Japanese Patent Laid-Open No. 2003-92858, it is not easy to secure or adjust the position of the temperature sensitive part of the temperature detection element with respect to the inner surface of the winding.

SUMMARY OF INVENTION

The present invention provides a fixture in which the position of a temperature detection element with respect to the windings of a stator of a motor can be easily and accurately fixed and adjusted, a motor comprising such a fixture and a method of securing a temperature detection element.

According to a first aspect of the present invention, there is provided a fixture which secures a temperature detection element to a winding provided around a stator core of a motor comprising: a main body to be inserted into a gap between the stator core and the winding; and an engagement portion that is formed on one end side of the main body on one side surface of the main body and that engages with a rim of an opening of the winding, wherein a recess to house a temperature sensitive part of the temperature detection element is formed on the one side of the main body, and wherein the depth of the recess is less than the maximum thickness of the temperature sensitive part of the temperature detection element.

According to the second aspect of the present invention there is provided the fixture according to the first aspect of the invention, wherein a hole to allow a lead wire of the temperature detection element to extend therethrough from the recess to the other end is formed in the other end of the main body.

According to the third aspect of the present invention there is provided the fixture according to the first or second aspects of the present invention, further comprising the dimensions of the hole are smaller than those of the temperature sensitive part.

According to the fourth aspect of the present invention there is provided the fixture according to any one of the first to third aspects of the present invention further comprising a plate-like member which extends from the engagement portion and which is arranged to be opposed to the one side surface.

According to a fifth aspect of the present invention, there is provided a motor comprising a stator core, a winding provided around the stator core, a temperature detection element comprising a temperature sensitive part and a lead wire electrically connected thereto, and the fixture according to any one of claims 1 to 4, wherein the temperature sensitive part is housed in the recess, the main body is inserted into a gap with the one end defining the rear end, and the engagement portion engages with the rim of the opening of the winding, and the temperature sensitive part is closely attached to the inner face of the winding.

According to a sixth aspect of the present invention, there is provided the motor according to the fifth aspect wherein the peripheral part of the stator is formed of a resin mold.

According to a seventh aspect of the present invention, there is provided a method of securing a temperature detection element to a winding by a fixture of a motor, the motor comprising: a stator core; a winding provided around the stator core; and the temperature detection element comprising a temperature sensitive part and a lead wire electrically connected thereto. The method for securing the temperature detection element to the motor specifically comprises: preparing the fixture of the first aspect as a fixture; housing the temperature sensitive part in the recess of the fixture; inserting the main body into the gap with the one end as the rear end, so as to face the inner surface of the windings; and engaging the engagement portion with the rim of the opening of the winding.

BRIEF DESCRIPTION OF THE DRAWINGS

The above mentioned objects, features, and advantages and other objects, features and advantages of the present invention will become more apparent from the following detailed description of the exemplary embodiments of the present invention illustrated in the accompanying drawings in which.

DETAILED DESCRIPTION

Hereinafter, embodiments of the present invention will be described with reference to the drawings. The same reference numbers for the same or corresponding constitutional elements are used over the drawings. The scale of the drawings showing the constitutional elements of the illustrated embodiments has appropriately been adjusted so as to facilitate the understanding of the present inventions. Below, a stator of a linear motor is used as an example to describe the present invention; however, the invention is not limited thereto. Further, constitutional elements which are the same as conventional constitutional elements illustrated in FIGS. 10A, 10B and 11 are described using the same reference numbers.

Figure 1:
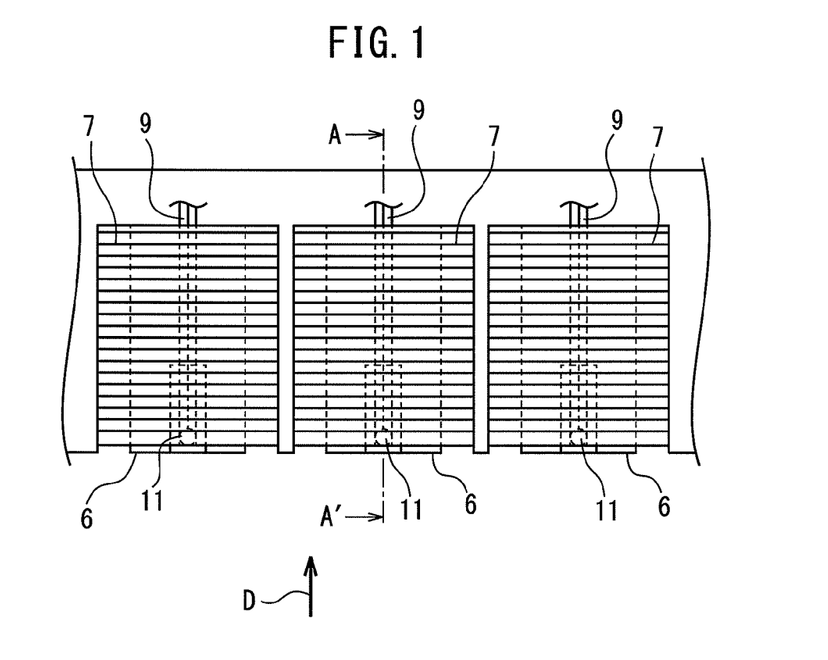
FIG. 1 is a lateral view of part of a stator of a motor according to an embodiment of the invention.
Figure 2:
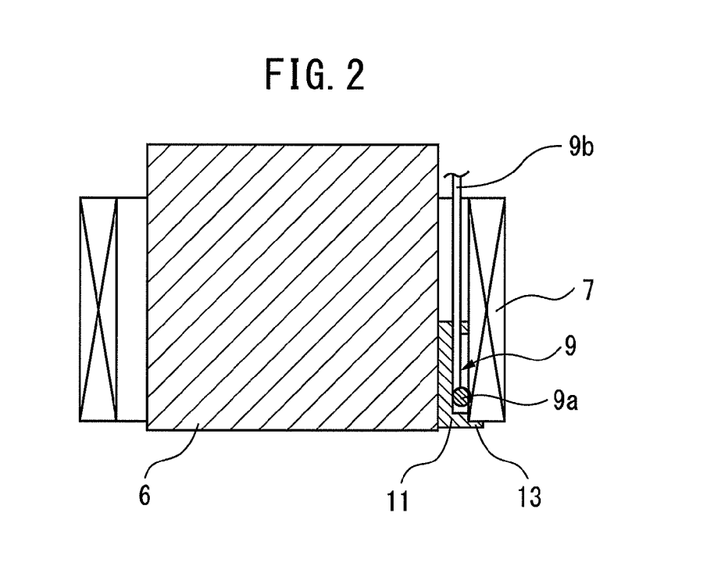
FIG. 2 is a cross-section view shown along the line A-A' in FIG. 1.

FIG. 1 is a lateral view of part of the stator of a motor of an embodiment of the invention and FIG. 2 is a cross-section view shown along the line A-A' in FIG. 1.

The stator of the present embodiment, as illustrated in FIG. 1, is made of a magnetic plate extending in a straight line on which a plurality of protrusions, namely, stator cores 6 are formed equidistantly in the extending direction of the magnetic plate. Windings 7 are formed on the stator cores 6.

The windings 7 are formed by winding a copper wire (conducting wire) around the circumferences of the stator cores 6, and the copper wire is coated with an insulating layer (not shown). The stator may be used for a motor used to linear movement, namely for a linear motor. Of course the stator of the present embodiment may be curved into a cylindrical shape to be used as a stator for a motor which generates rotational torque.

In order to measure the temperature of the windings 7, the temperature detection elements 9 are inserted into a gap between the stator cores 6 and the windings 7 (preferably at the coil ends of the winding 7). Further, the fixtures 11 are used to secure the temperature detection elements 9 such that the temperature sensitive parts of the temperature detection elements 9 inserted into the gap are maintained in contact with one side face of the windings 7.

Herein the configuration of the temperature detection element 9 and the fixture 11 will be described in detail.

Figure 3A:
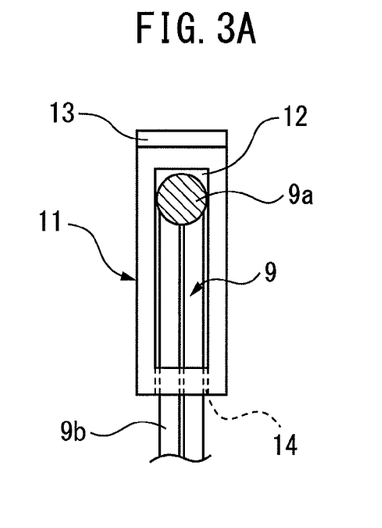
FIG. 3A is a front view of a fixture, having therein a temperature detection element according to the present embodiment of the invention.
Figure 3B:
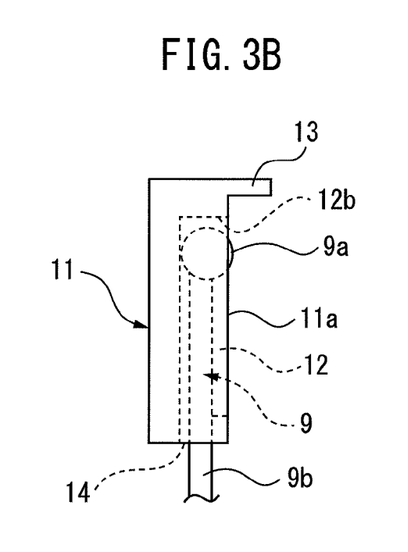
FIG. 3B is a lateral view of the temperature detection element and the fixture illustrated in FIG. 3A.
Figure 4A:
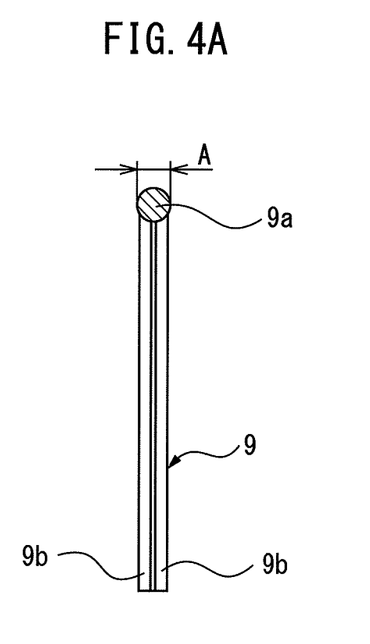
FIG. 4A is a front view of the temperature detection element according to the present embodiment of the invention.
Figure 4B:
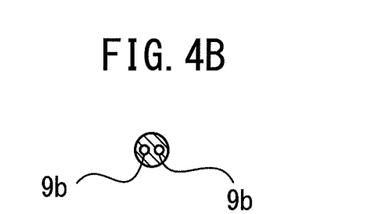
FIG. 4B is a bottom view of the temperature detection element illustrated in FIG. 4A viewed from the tip side of the lead wire.
Figure 5A:
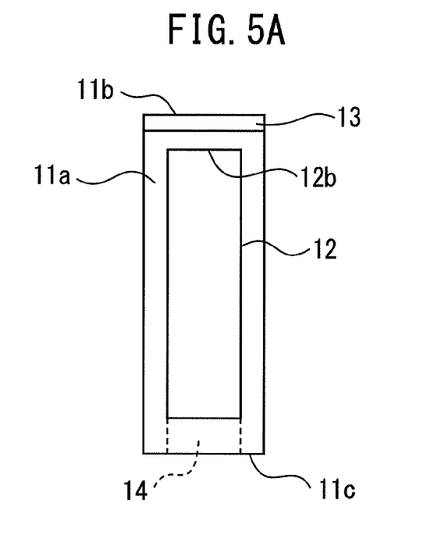
FIG. 5A is a front view of a fixture according to the present embodiment.
Figure 5B:
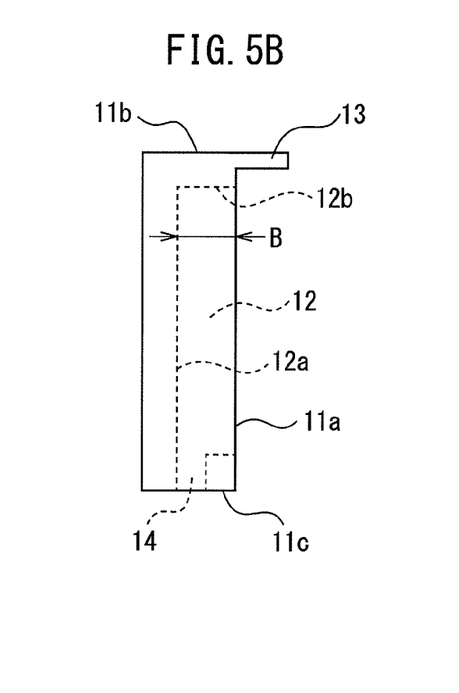
FIG. 5B is a lateral view of the fixture illustrated in FIG. 5A
Figure 5C:
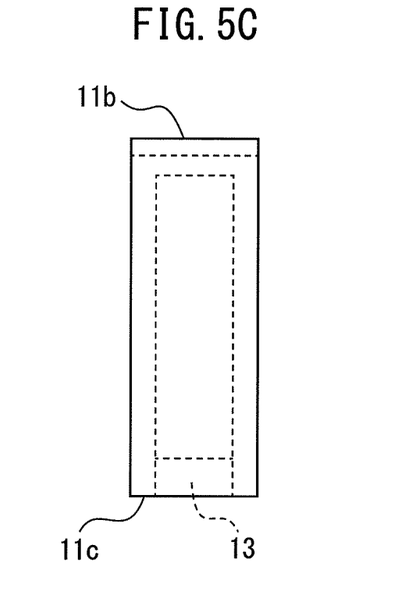
FIG. 5C is a rear view of the fixture illustrated in FIG. 5A.
Figure 5D:
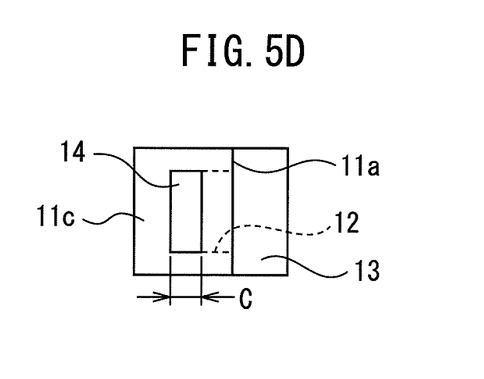
FIG. 5D is a bottom view of the fixture illustrated in FIG. 5A.

FIG. 3A is a front view of the fixture 11 in which the temperature detection element 9 is housed and FIG. 3B is a lateral view of the temperature detection element 9 and the fixture 11 illustrated in FIG. 3A. FIG. 4A is a front view of the temperature detection element 9; FIG. 4B is a bottom view of the temperature detection element 9 illustrated in FIG. 4A viewed from the tip side of the lead wire. Further, FIG. 5A is a front view of the fixture, FIG. 5B is a lateral view of the fixture 11 illustrated in FIG. 5A, FIG. 5C is a rear view of the fixture 11 illustrated in FIG. 5A, and FIG. 5D is a bottom view of the fixture 11 illustrated in FIG. 5A.

The temperature detection element 9 of the present embodiment is any of the followings: a PTC thermistor, a NTC thermistor, a thermostat or a thermocouple. As can be seen in FIGS. 4A and 4B, the temperature detection element 9 is composed of a temperature sensitive part 9a to be provided at a desired place for measuring the temperature, and two integrated lead wires 9b which apply a voltage to the temperature sensitive part 9a.

As can be seen in FIGS. 5A to 5D, the fixture of the present embodiment has a substantially cuboid-shaped main body. In one side surface 11a of the fixture 11, a recess 12 is formed to house the temperature detection element 9. The recess 12 extends from the vicinity of one end 11b of the fixture 11 to the vicinity of the other end 11c thereof.

The depth B of the recess 12 from the one side surface 11a to the bottom surface 12a thereof, is less than the thickness A (FIG. 4) of the temperature sensitive part 9a of the temperature detection element 9. As the depth of the recess 12 is so defined, when the temperature sensitive part 9a is housed in the recess 12 as shown in FIGS. 3A and 3B, a portion of the outer surface of the temperature sensitive part 9a protrudes from the one side surface 11a of the fixture 11. Note that, the temperature sensitive part 9a of the present embodiment is substantially spherical; however, as long as it protrudes from the one side surface 11a of the fixture 11 when housed in the recess 12, the shape is not limited to spherical.

Further, a plate-like protrusion 13 protrudes from the one side surface 11a of the fixture 11 along the one end 11b. The protrusion 13 is provided as an engagement portion to engage with the rim of the opening of the winding 7 when the fixture 11 is inserted into the gap between the stator core 6 and the winding 7. Note that, the protrusion 13 may be made of a separate piece from the main body of the fixture 11.

Furthermore, a hole 14 is formed in the other end of the fixture 11 and connects to the space in recess 12. When the temperature detection element 9 is housed in the recess 12, the lead wires 9b of the temperature detection element 9 extend through the hole 14 to the outside of the fixture 11.

The hole 14 of the present embodiment is rectangular and the length C thereof in the minor side direction is preferably shorter than the thickness A (FIG. 4A) of the temperature sensitive part 9a of the temperature detection element 9. Accordingly, even if the temperature sensitive part 9a of the temperature detection element 9 housed in the recess 12 is moved in the direction in which the lead wire 9b extends, the temperature sensitive part 9a cannot fall through the hole 14 to the outside of the fixture 11.

Figure 6A:
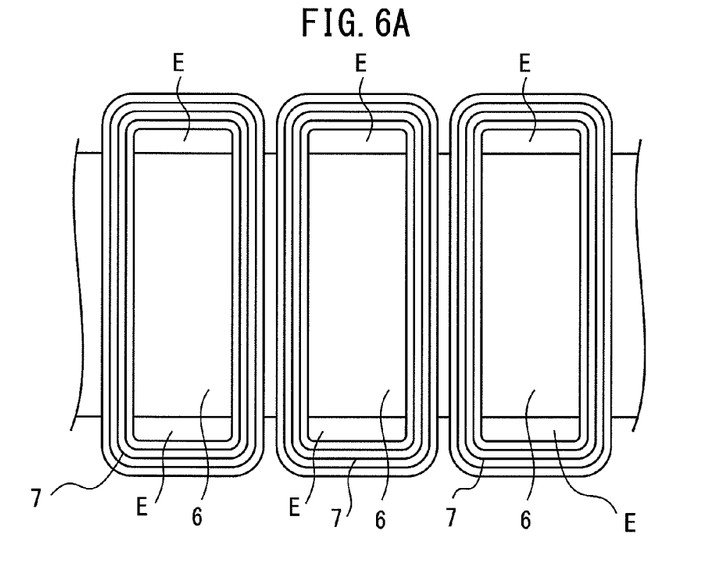
FIG. 6A is a view illustrating a first step of attaching the fixture according to the present embodiment to the windings.
Figure 6B:
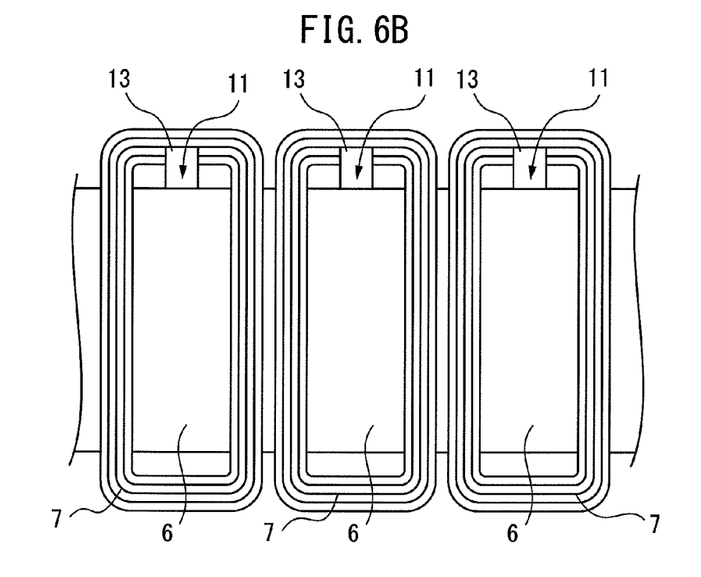
FIG. 6B is a view illustrating a second step of attaching the fixture according to the present embodiment to the windings.

Next, the method of securing the temperature detection element 9 to the winding 7 with the aforementioned fixture 11 will be described with reference to FIGS. 1 to 6A and 6B. FIG. 6A illustrates the first step of attaching the fixture 11 to the winding 7. FIG. 6B illustrates the second step thereof. Note that, FIGS. 6A and 6B show the stator core 6 viewed from the direction of the arrow D in FIG. 1

First, a worker that assembles the motor or an assembly device (not illustrated) houses the temperature sensitive part 9a of the temperature detection element 9 shown in FIGS. 4A and 4B in the recess 12 of the fixture 11 as shown in FIGS. 3A and 3B. Then the lead wires 9b of the temperature detection element 9 while housed in the recess 12, are inserted in the hole 14 to the outside of the fixture 11, as shown in FIGS. 3A and 3B.

Next, the fixture 11 with the temperature detection element 9 housed therein is inserted into the gap E between the stator core 6 and the winding 7 as can be understood from FIGS. 6A and 6B. At this time, as illustrated in FIGS. 1 and 2, the fixture 11, oriented such that the lead wires 9b are the front ends facing the gap E, is inserted into the gap E while passing the lead wires 9b through the gap E. The one end 11b of the fixture 11 is the rear end in the insertion direction.

In the step for inserting the fixture 11 into the gap E as described above, the depth B of the recess 12 of the fixture 11 is smaller than the smallest thickness "A" of the temperature sensitive part 9a of the temperature detection device 9. Accordingly, when the temperature sensitive part 9a is housed in the recess 12, as shown in FIGS. 3A and 3B, a portion of the outer surface of the temperature sensitive part 9a protrudes from the one side surface 11a of the fixture 11. Thus, as shown in FIG. 2, the temperature sensitive part 9a is reliably brought into contact with the inside surface of the winding 7 when the fixture 11 is inserted into the gap E.

Note that, in the present embodiment, as the temperature sensitive part 9a protrudes from the one side surface 11a of the fixture 11, a resilient, plate like member is not provided on the bottom surface 12a of the recess 12 unlike the method described in Japanese Patent Laid-Open No. 2003-92858 which was described hereinabove under Description of the Related Art. In order to miniaturize and lighten a motor, a portion of a stator may be formed by a resin mold. In such cases, high temperature resin may flow into the periphery of the stator core 6 in the molding die, and due to the heat it is thought that the aforementioned plate-like member will deform. Thus, when a portion of, or the whole of a motor is formed from a resin mold, there is the risk that the temperature sensitive part 9a of the temperature detection element 9 fails to be reliably in contact with the inside surface of the winding 7. With respect thereto, the present embodiment does not use the above plate-like member thus such a risk is unlikely to occur.

Further, when the fixture 11 is inserted into the gap E, the protrusion 13 provided on the one end 11b side of the fixture 11 engages the rim of the opening of the winding 7 (FIGS. 1 and 2). Accordingly, in the insertion step of the fixture 11, the position of the fixture 11 in the insertion direction of the fixture into gap E can be made constant. Furthermore, while inserting the fixture 11 into the gap E, so as to prevent the temperature sensitive part 9a moving in a direction opposite the insertion direction of the fixture 11 in the recess 12, the position of the temperature sensitive part 9a is restricted by the one end surface 12b of the recess 12. Accordingly, the position of the temperature sensitive part 9a in the recess 12 can be determined by the one end surface 12b of the recess 12.

Namely, the temperature sensitive part 9a of the temperature detection element 9 housed in the recess 12 of the fixture, can always be arranged in the same place in the insertion direction of the fixture 11 into the gap E. Therefore, in the step of inserting the fixture 11, it is possible to place the temperature sensitive part 9a of the temperature detection element 9 at a desired place for measuring the temperature of the winding 7.

As described above, by the simple step of inserting the fixture 11 into the gap E between the stator core 6 and the winding 7, the temperature sensitive part 9a of the temperature detection element 9 can be reliably brought into contact with the inside surface of the winding 7 at a desired place for measuring the temperature. Accordingly, when a large current flows through the winding 7, the fact that a temperature generated at the desired place for measuring the temperature on the winding 7 exceeds a predetermined temperature, can be swiftly and accurately detected.

Further, the operation for contacting the temperature sensitive part 9a of the temperature detection element 9 to the inside surface of the winding 7 is, as stated above, simply the insertion of the fixture 11 into the gap E. Thus the operation can not only be carried out manually but can also be automated.

If it becomes necessary to adjust the position of the temperature detection element 9 with respect to the winding 7, the fixture can either be pushed or pulled out from the gap E and the position of the temperature detection element 9 can be easily adjusted. Further, exchanging the temperature detection element 9 is also simple.

Note that, it is preferable for the fixture 11 to be made from an insulating material such as a plastic or a rubber, or for the surface to be coated with an insulating layer.

Further, in the aforementioned embodiment, for the temperature sensitive part 9a of the temperature detection element 9 to closely contact the inside surface of the winding 7, it is preferable for the thickness of the fixture 11 to be greater than the size of the gap E. However, in order to increase the contiguity of the temperature sensitive part 9a with the winding 7 other embodiments as shown below may be adopted.

Figure 7A:
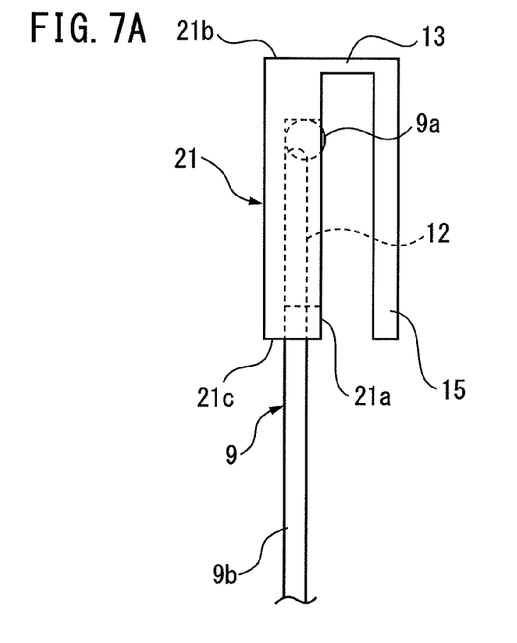
FIG. 7A is a front view of another embodiment of the fixture.
Figure 7B:
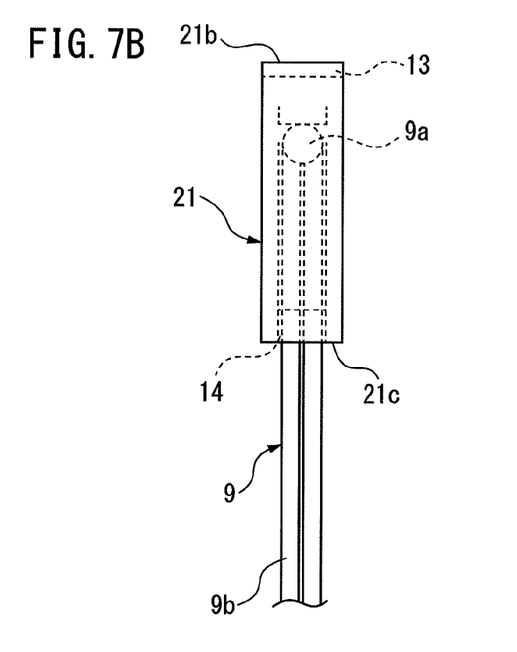
FIG. 7B is a right-side view of the fixture illustrated in FIG. 7A.
Figure 7C:
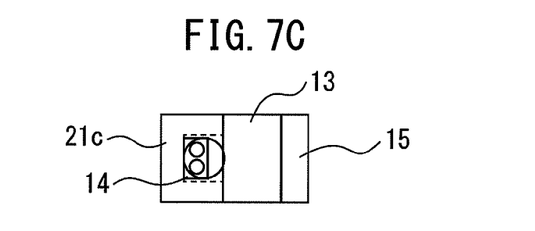
FIG. 7C is a bottom view of the fixture illustrated in FIG. 7A.
Figure 8:
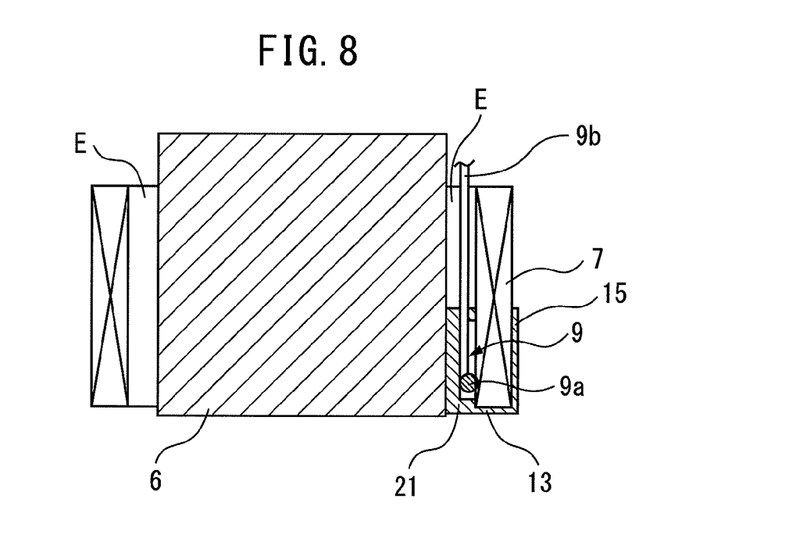
FIG. 8 is a view illustrating a fixture of another embodiment, attached to the windings together with the temperature detection element.

The following describes other embodiments of the present invention. FIG. 7A is a front view of another embodiment of the fixture 21, FIG. 7B is a lateral view of the embodiment illustrated in FIG. 7A, and FIG. 7C is a bottom view of the embodiment illustrated in FIG. 7A. FIG. 8 is a view illustrating the fixture 21 of the other embodiment attached to the winding 7 and corresponds to FIG. 2. Note that, in these drawings, the same reference numerals as those used for the previously described embodiment of the fixture 11 are used for the same structural components.

The fixture of the embodiment illustrated in FIGS. 7A, 7B and 7C has a substantially cuboid-shaped main body 21. A recess 12 is formed in the one side surface 21a of the main body 21 to house the temperature detection element 9. The recess 12 extends from the vicinity of the one end 21b of the main body 21 to the vicinity of the other end 21c. The depth of the recess 12 from the one side surface 21a is less than the thickness of the temperature sensitive part 9a of the temperature detection element 9 as in the previous embodiment. Accordingly, when the temperature sensitive part 9a is housed in the recess 12, a portion of the outer surface of the temperature sensitive part 9a protrudes from the one side surface 21a of the main body 21.

Furthermore, a plate-like protrusion 13 protrudes from the one side surface 21a of the main body 21 along the one end 21b. The protrusion 13, in the same way as in the previously described embodiment, is used as an engagement portion, which engages the rim of the opening of the winding 7 when the main body 21 of the fixture is inserted into the gap E between the stator core 6 and the winding 7.

In the other end 21c of the main body 21, a hole 14 is formed connecting to the space in the recess 12. The hole is formed in a rectangular shape, with the length in the minor side direction preferably shorter than the thickness of the temperature sensitive part 9a of the temperature detection element 9. This is to prevent the temperature sensitive part 9a housed in the recess 12, from falling out of the hole to the outside of the fixture 11.

In addition, as illustrated in FIGS. 7A, 7B and 7C, a plate-like member 15 is provided to be opposed to the one side surface 21a of the main body 21. The plate-like member 15 is formed integrally with the protrusion 13 and extends therefrom. It is preferable that the gap between the one side surface 21a and the plate-like member 15 be less than the thickness of the winding 7. Note that, the protrusion 13 and the plate-like member 15 may be made of a separate piece from the main body 21 of the fixture.

In the other embodiment described above, as illustrated in FIG. 8, when the main body 21 is inserted into the gap between the stator core 6 and the winding 7, the protrusion 13 not only engages the rim of the opening of the winding 7, but the winding 7 is also held between the one side surface 21a of the main body 21 and the plate-like member 15. Accordingly, the outside surface of the temperature sensitive part 9a protruding from the one side surface 21a of the main body 21 is brought into contact with the inside surface of the winding 7, and the contiguity of the temperature sensitive part 9a and the winding 7 can be increased. It should be note that not only is this effect brought about but also the effects brought about by the aforementioned fixture 11 can be achieved.

In the above description, the present invention is described using an example of a stator of a linear motor; however, the present invention is not limited thereto and is applicable to the stator of a motor which generates rotational torque. Further, the scope of the present invention encompasses motors manufactured with the fixture of the present invention and machine tools equipped with such motors.

Effects of the Invention

According to one embodiment of the present invention, a recess for housing the temperature sensitive part of the temperature detection element is formed in one side surface of the main body of the fixture, and the depth of the recess is less than the maximum thickness of the temperature sensitive part of the temperature detection element. Accordingly, the outer surface of the temperature sensitive part housed in the recess protrudes from the one side surface of the main body. Thus, when the main body of the fixture is inserted into the gap between the stator core and the winding such that the one side surface of the main body faces the inside surface of the winding, the inside surface of the winding closely contacts the temperature sensitive part. As the temperature sensitive part is made to contact the inside surface of the winding by such a simple operation, the position of the temperature detection element with respect to the winding can be easily fixed and adjusted.

Further, when the main body of the fixture is inserted into the aforementioned gap, the engagement portion engages with the rim of the opening of the winding, so that the position of the temperature sensitive part with respect to the winding can be accurately secured.

According to another embodiment of the present invention, a lead wire extending from the temperature sensitive part of the temperature detection element housed in the recess of the main body of the fixture, can be extended in a hole through the recess to the outside of the main body of the fixture.

According to the other embodiment, in the fixture of the above-described embodiment, the dimensions of the hole through which the lead extends are smaller than those of the temperature sensitive part. Accordingly, even if the lead wire is pulled, the temperature sensitive part cannot fall through the hole to the outside of the main body of the fixture.

According to the other embodiment, when the main body of the fixture is inserted into the aforementioned gap, the engagement portion engages with the rim of the opening of the winding, and the winding is held between one side surface of the main body and the plate-like member. Accordingly the outer surface of the temperature sensitive part protruding from one side surface of the main body is brought into contact with the inner surface of the winding, and the contiguity between the temperature sensitive part and the winding is improved.

According to another embodiment of the present invention, when the fixture is used in a motor in which the periphery of the stator core is made of a resin mold, the temperature sensitive part of the temperature detection element can be made to be in contact with the inner surface of the winding. Namely, the fixture of the present invention, as a means for protruding the temperature sensitive part from the one side surface of the main body of the fixture, is not provided with a resilient plate-like member at the bottom surface of the recess of the main body. Therefore, when a portion of the stator is made of a resin mold, the problem of the aforementioned plate-like body deforming due to heat of the high temperature resin does not occur. Thus, a resin-molded motor can be obtained in which the temperature sensitive part is in contact with the inner surface of the windings.

Embodiments of the present invention have been illustrated above. However, the present invention is not limited to the embodiments described above, and without departing from the scope of the present invention; changes to the above-described embodiments may be made to include various shapes, configurations and materials.

What is claimed is:

1. A fixture that secures a temperature detection element to a winding provided around a stator core of a motor, said fixture comprising:
   a main body to be inserted into a gap between the stator core and the winding; and
   an engagement portion that is formed on one end side of the main body and on one side surface of the main body and wherein said engagement portion engages with a rim of an opening of the winding; wherein a recess to house a temperature sensitive part of the temperature detection element is formed on the one side surface of the main body; and wherein a depth of the recess is less than a maximum thickness of the temperature sensitive part of the temperature detection element.

2. The fixture according to claim 1, wherein a hole to allow a lead wire of the temperature detection element to extend therethrough from the recess to the other end of the main body is formed in the other end of the main body.

3. The fixture according to claim 2, wherein dimensions of the hole are smaller than those of the temperature sensitive part.

4. The fixture according to claim 1, further comprising a plate-like member that extends from the engagement portion and that is arranged to be opposed to the one side surface.

5. A motor comprising a stator core, a winding provided around the stator core, a temperature detection element comprising a temperature sensitive part and a lead wire electrically connected thereto, and the fixture according to claim 1, wherein the temperature sensitive part is housed in the recess, the main body is inserted into a gap with the one end defining the rear end, and the engagement portion engages with the rim of the opening of the winding and the temperature sensitive part is closely attached to an inner face of the winding.

6. The motor according to claim 5, wherein a peripheral part of the stator is formed of a resin mold.

7. A method of securing a temperature detection element to windings by a fixture of a motor, the motor comprising: a stator core; a winding provided around the stator core; and the temperature detection element comprising a temperature sensitive part and a lead wire electrically connected thereto, wherein the fixture comprising a main body to be inserted in a gap between the stator core and the winding and an engagement portion that is formed on one end side of the main body and on one side surface of the main body and wherein said engagement portion engages with a rim of an opening of an winding, a recess is formed on the one side surface of the main body to house the temperature sensitive part of the temperature detection element, an depth of the recess is less than an maximum thickness of the temperature sensitive part of the temperature detection element, wherein the method comprises the steps of: housing the temperature sensitive part in the recess; inserting the main body that housing the temperature sensitive part into the gap, with the one end side defining a rear end, with the one side surface facing an inner surface of the winding; and engaging the engagement portion with the rim of the opening of the winding.

* * * * *